United States Patent [19]

Lee

[11] 4,449,821

[45] May 22, 1984

[54] PROCESS COLORIMETER

[75] Inventor: Jerald D. Lee, Mendenhall, Pa.

[73] Assignee: E. I. Du Pont de Nemours and Company, Wilmington, Del.

[21] Appl. No.: 398,385

[22] Filed: Jul. 14, 1982

[51] Int. Cl.³ .............................................. G01J 3/42
[52] U.S. Cl. ..................................... 356/319; 250/205
[58] Field of Search ........................ 356/319, 323–325, 356/45; 250/205

[56] References Cited

U.S. PATENT DOCUMENTS

| | | |
|---|---|---|
| 3,245,305 | 8/1961 | Turner . |
| 3,431,054 | 3/1969 | Doonan et al. ...................... 356/109 |
| 3,506,358 | 4/1970 | Hiroaki et al. ........................ 356/86 |
| 3,646,331 | 2/1972 | Lord ................................. 235/151.3 |
| 3,806,258 | 4/1974 | Rich ..................................... 356/226 |
| 3,874,799 | 4/1975 | Isaacs et al. .......................... 356/173 |
| 3,941,487 | 3/1976 | Ehret et al. .......................... 356/411 |
| 4,093,991 | 6/1978 | Christie, Jr. et al. ............... 364/525 |
| 4,165,180 | 8/1979 | Failes .................................. 356/310 |
| 4,176,957 | 12/1979 | Maeda et al. ....................... 356/319 |
| 4,227,811 | 10/1980 | Tohyama et al. ................... 356/325 |
| 4,247,202 | 1/1981 | Failes .................................. 356/310 |
| 4,412,744 | 11/1983 | Lee et al. ............................. 356/319 |

OTHER PUBLICATIONS

On-Line Colour Measurement, Paint & Resin, Sep.-/Oct. 1981, pp. 21–23 Using Fiber Optics in Colorimetry, Hammel, Modern Paint and Coating, Feb./1981.

Primary Examiner—F. L. Evans

[57] ABSTRACT

A colorimeter for measuring color of an object, in particular for measuring the color of liquids such as paints in a process stream. In the colorimeter, a single analytical light beam, with its blue and red intensity ratio controlled through a feedback loop, is directed to a sample whose color is being measured. A portion of the analytical light beam is reflected from the sample into a grating monochromator which disperses the light beam into its spectra. A detector array is attached to the monochromator which converts the spectra of the light beam into discrete signals which are then multiplexed with instrument status and reference color signals into an A/D converter. The output of the A/D converter is then fed directly to a computer programmed to directly provide standard color values.

9 Claims, 3 Drawing Figures

PROCESS COLORIMETER

BACKGROUND OF THE INVENTION

1. Field of the Invention

This invention is related to a colorimeter and in particular, to an improved colorimeter for measuring the color of liquid in process streams.

2. Description of the Prior Art

The following prior art shows colorimeter and other color measurement devices:

U.S. Pat. No. 3,245,305 issued Apr. 12, 1966 to Turner is directed to a spectrometric apparatus with two sources of radiation, and at least one non-wavelength selective detector. The intensities of the two sources of radiation are separately measured and compared by ratioing means. The result then is used to adjust the intensity of one of the sources to maintain the intensity ratio constant.

U.S. Pat. No. 3,431,054 issued Mar. 4, 1969 to Doonan, et al, is directed to a scanning monochromator device with a broad-band spectral source that has a controlled output of radiant flux over the band of wavelengths to be scanned. The source is controlled according to an adjustable preset pattern by a variable control signal generator that varies with wavelength such that the intensity remains uniform throughout the scan.

U.S. Pat. No. 3,506,358 issued Apr. 14, 1980 to Hiroack Baba, et al. is directed to a rapid scanning double beam spectrophotometer in which a photoelectric detector is provided in each light path and the supply voltage to the detector is controlled so that the output of each detector is always at a constant level to provide for variations of intensity of light source used in the spectrophotometer.

U.S. Pat. No. 3,646,331 issued Feb. 29, 1972 to Lord is directed to a method and apparatus for correcting radiation measuring errors in a spectrophotometer. Correction factors for each discrete wavelength are stored in a computer and applied to the output of the apparatus when measurements are made.

U.S. Pat. No. 3,806,258 issued Apr. 23, 1974 to Rich is directed to an absorptionmeter in which the lamp source input power is set to a level to obtain a predetermined output; thereafter, non-wavelength selective feedback control means are provided to maintain the input lamp power at this set output level while measurements are being made.

U.S. Pat. No. 4,093,991 issued June 6, 1978 to Christie, Jr., et al. is directed to a scanning spectrophotometer-digital data processing system which includes a microcomputer.

U.S. Pat. No. 4,176,957 issued Dec. 4, 1979 to Meada, et al, is directed toward a method for optically analyzing a specimen using a double beam spectrometer having an analytical beam and a reference beam. The ratios of the intensity of the analytical and reference beams are measured when no specimen is present, then these values are applied to the corresponding reflectance measurements of a specimen to neutralize the effect of errors.

In the art of spectrophotometry, the need to correct for variations in light source intensity before accurate specimen measurements can be obtained is well recognized; however, no instrument currently exists that is able to compensate for changes in both source color temperature and spectral intensity shifts that are produced by source emission variations. In this invention, a feedback control is provided to maintain the light source at a specific predetermined color temperature and in addition compensation is made in the measurement for fluctuations in output flux of the prescribed color temperature. A further advantage of the instrument of this invention is that there is no movement of parts during the measurement phase, thus extending its serviceability.

SUMMARY OF THE INVENTION

A colorimeter for measuring color of an object has the following components:

(a) a single light source that provides a light beam, (b) a controller electrically connected to the light source, (c) first beam-shaping optics for collimating and directing the light beam to the object;

(d) a beam-splitter positioned between the object and the first beam-shaping optics which divides the light beam into a reference and analytical light beam, (e) blue and red intensity sensors electrically connected to the controller, which sensors measure the blue and red spectral intensities of the reference light beam incident on these sensors and produce; (1) electrical feedback signals to the controller which maintains the light source at a constant color temperature level, and (2) a color intensity reference signal, (f) second beam-shaping optics for directing a portion of the analytical light beam that is reflected from the object into a monochromator, (g) a grating monochromator with an entrance slit through which the reflected portion of the analytical light beam passes, (h) a detector array which converts the spectra of the light beam, dispersed by the monochromator, into discrete individual electrical signals, (i) a first multiplexer system which receives electrical signals from the detector array and selectively transmits these signals to a second multiplexer, and (j) a second multiplexer system which receives the signal from said first multiplexer system and the color intensity reference signal from one of the color intensity sensors to output a signal representing standardized color values of the object measured.

DETAILED DESCRIPTION OF THE INVENTION

Figure 1:
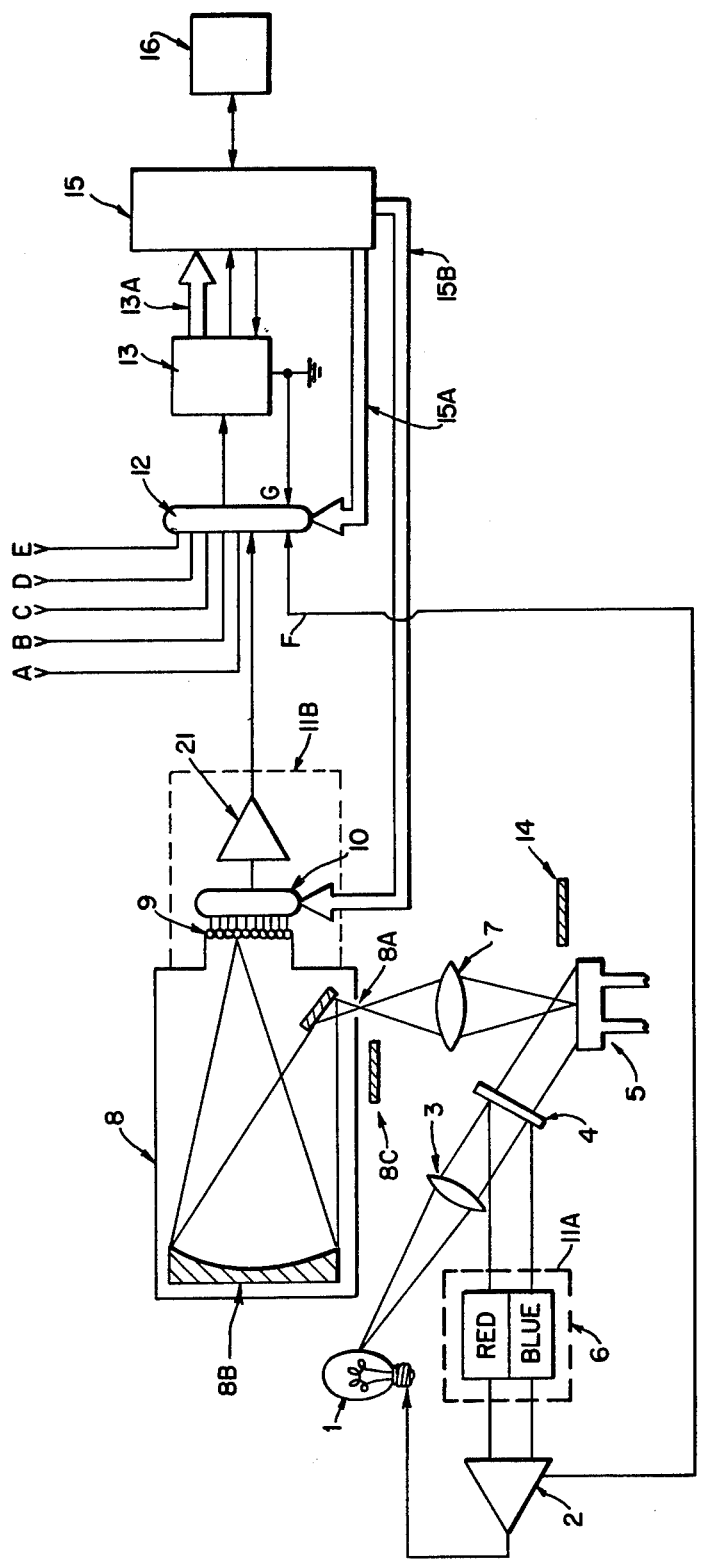
FIG. 1 is a simplified diagram of the apparatus.

FIG. 1 illustrates a simplified diagram of the apparatus of this invention. The components illustrated in the diagram are positioned in a metal housing with an opening for placement of samples the colors of which are to be measured. A computer 15 with an I/O Device 16 such as a keyboard terminal with a digital display unit can be connected to the apparatus to provide a direct readout of values computed from spectral data such as standard CIE tristimulus color values or color coordinate values of the object whose color is being measured.

Standard equations for calculating these values are shown in "Principles of Color Technology" 2nd Edition, Billmeyer and Saltzman, John Wiley and Sons, 1981.

A lamp controller 2 contains a D.C. power supply and amplifier circuits needed to control the power input to lamp 1. The lamp typically is a DZB 12 volt 100 watt quartz halogen lamp. A light beam from the lamp 1 passes through a collimating lens 3 and through a beam splitter 4 which divides the light beam into two parts. One part of the light beam, the analytical beam, is directed to the object being measured which is illustrated as a cell 5 having paint continuously pumped through the cell. The other part, the reference beam, is directed to color intensity sensors 6 which measure red and blue intensities of the light beam and feeds back a control signal to the controller 2 which controls the color temperature of the lamp 1.

The analytical beam is reflected from the object being measured through an imaging lens 7 into a grating monochromator 8 through entrance slit 8A. Monochromator 8, typically a type VFS 200 manufactured by Instruments, S.A. Inc. includes a 300 line/mm holographic grating 8B, which disperses the light into a spectral band. The individual portion of the band is measured by a silicon detector array 9 which in turn feeds electrical signals to a first multiplexer circuit 10.

The spectral signals from the first multiplexer circuit 10 are fed sequentially into a second multiplexer circuit 12. Also, instrument status signals are fed into multiplexer circuit 12 on the following lines:

A—Detector array 9 temperature controller duty cycle.
B—Color intensity sensor 6 temperature controller duty cycle.
C—Voltage supply monitor.
D—Instrument baseplate temperature.
E—Lamp 1 voltage monitor
F—Blue reference intensity level
G—Ground input monitor for analog/digital converter 13

The signals from the multiplex circuit 12 can be read out directly. However, they are preferably fed into a computer 15 through an A/D (analog/digital) converter 13 for conversion into standard color values such as CIE tristimulus color values or CIE L*, a*, b* cube root color coordinates.

The A/D converter 13 typically is a Burr Brown ADC 100 high resolution integrating A/D converter with a 16-bit accuracy and 0.2 second conversion interval. The 16-bit databus output 13A feeds into computer 15. Computer 15 typically is a Hewlett Packard HP-9825 desktop computer which requires a 16 bit input, 16 bit output, a flag line and preferably a separate control line and monitored by I/O Device 16. A 3-bit databus output 15A from the computer 15 controls multiplexer 12. A 6-bit databus output 15B from the computer 15 controls multiplexer 10.

Figure 3:
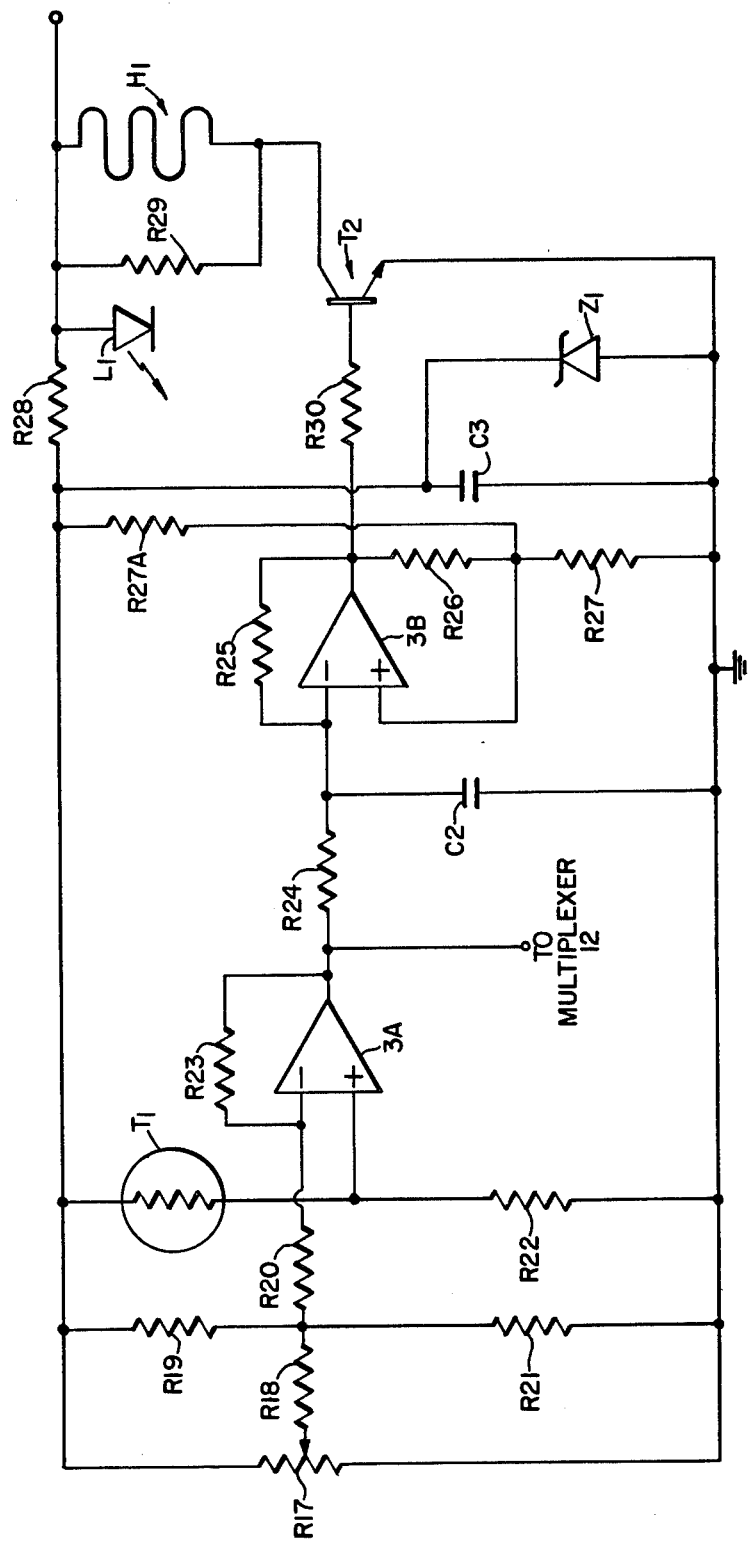
FIG. 3 is a schematic circuit diagram of a temperature controller circuit.

A temperature controller circuit 11A is connected to the color intensity sensors 6 and multiplexer circuit 12. A separate temperature controller circuit 11B is connected to the enclosure for the multiplexer circuit 10, detector array 9 and preamplifier 21. These circuits compensate for changes in ambient temperature. Each circuit comprises a thermistor temperature sensing element mounted to the exterior of a heat-conductive enclosure which is further attached to a thin foil heater that evenly distributes the heat within the circuit enclosure. The circuit can provide a temperature control accuracy of about 0.004° C./°C. change in ambient temperature at 36° C. (FIG. 3 shows circuits 11A and 11B.)

The colorimeter is calibrated by replacing the object being measured with a known internal reference color 14 to provide calibration intensities at all wavelengths. This is conveniently controlled by the computer 15. Shutter 8C can be closed blocking all light passing through the entrance slit 8A to obtain a zero reading on the colorimeter.

The colorimeter is designed primarily to measure reflectances at a glass-liquid interface. However, the intensity of the light incident upon liquid samples is the same as that needed to analyze solid plaques which may also be affixed to the colorimeter.

Although the analytical beam of light from the lamp 1 to the cell 5 is 45 degrees from the perpendicular, the cell is viewed perpendicular to its window. The cell used in the colorimeter is described in U.S. Pat. No. 3,020,795 issued Feb. 13, 1962 to McKinney and Reilly. This patent describes the means used to obtain a vanishingly small radial component of flow velocity at the center of the cell window. Since deposits may accumulate there, the viewing area of the cell is shifted off-center and enlarged to about 3 mm horizontal by 1 cm vertical by a defocussing lens 7 placed between the cell and grating monochromator entrance slit 8A.

The grating of the monochromator 8 provides high dispersion in order to accommodate a wide entrance slit 8A and concomitant high flux throughput. Furthermore, a silicon detector array 9 is used at the image plane of the grating in order to eliminate the need for mechanical wavelength scanning. Although stray light degrades absolute colorimeter accuracy, it still permits accurate measurements of color differences for non-metameric colors.

The stray light is minimized by the use of a holographic grating 8B. When coupled with appropriate known color standards, the colorimeter data permits good colorimetric accuracy in process control.

Figure 2:
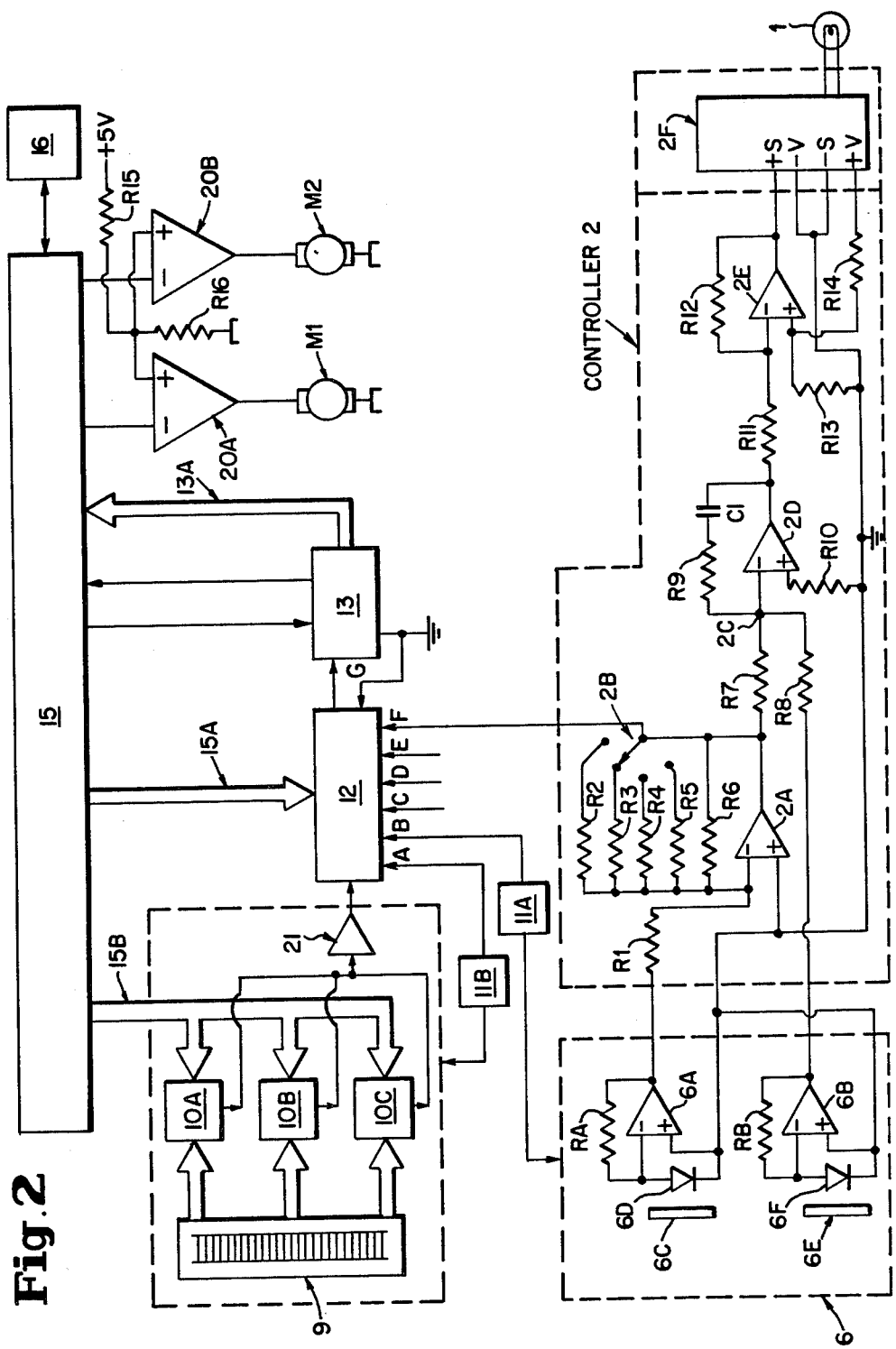
FIG. 2 is a schematic circuit diagram of the electrical circuit used in the apparatus.

Referring to FIG. 2, the color temperature feedback control loop comprises lamp 1, color intensity sensors 6, and controller 2. Color intensity sensors 6 comprise two current-mode operated operational amplifier 6A and 6B. Operational amplifier 6A, typically an Analog Device AD515, senses the intensity of optically-filtered blue wavelengths produced by lamp 1 using a United Detector Technology type 5DP photo diode 6D. The diode is operatively connected between the two input terminals with its cathode joining the non-inverting input terminal of OpAmp 6A to circuit common. A 1 megohm feedback resistor RA is typically used. The optical filter used is typically a type 5-59 Corning, blue transmission filter 6C with a wavelength of around 450 $\eta$m.

Operational amplifier 6B is similarly configured using the above photodiode 6F and 1 megohm resistor RB with the following exceptions—(1) the filtered red wavelengths are extracted by means of a type 7-69 Corning Infrared transmission filter 6E with a wavelength of around 1 $\mu$m, and (2) RCA 3140 OpAmp 6B is used to obtain stability for handling the larger signals. (Note: the AD 515 obtains better stability at like wavelengths when the signal is smaller.)

Controller 2 comprises three sequential amplifier circuits 2A, 2D and 2E. All are designed around type 741 operational amplifiers and operate to provide smooth control for lamp power supply circuit 2F.

The output terminal of blue intensity sensor 6A, which provides the reference intensity level in the embodiment shown, is connected to the inverting terminal of OpAmp 2A via an 8.25KΩ input resistor, R1. OpAmp 2A is configured to provide a selectable degree of gain to the input signal by means of a four-position BCD switch 2B. Typically, one or more values from the parallel array of 2 MΩ, 1 MΩ, 500KΩ and 200KΩ resistors, R2, R3, R4, and R5, respectively, may be selected for use with a 100KΩ fixed resistor R6 in the feedback path. The output terminal of OpAmp 2A is connected to (1) the summing junction 2C via a 50KΩ dropping resistor R7 which in turn is joined to the inverting input terminal of OpAmp 2D, and (2) to input terminal F of multiplexer 12.

In a similar fashion, the output terminal of OpAmp 6B is connected to the inverting input terminal of OpAmp 2D via a second 50KΩ resistor R8. Operational amplifier 2D is configured as a low pass filter with a series-connected 0.1 μF capacitor C1 and a 100KΩ resistor R9 in the feedback path, and a 25KΩ bias resistor R10 connecting the non-inverting terminal to circuit common. This circuit is used to smooth the small resultant difference signal between the red and blue sensor outputs before final amplification by the circuit of OpAmp 2E.

OpAmp 2E is configured as a gain-of-four linear amplifier with a 5KΩ input resistor, R11, a 20KΩ feedback resistor R12, and the ends of two 5KΩ bias resistors R13, R14 connected to the non-inverting terminal. The first of the two 5KΩ bias resistors, R13, terminates in circuit common, whereas the other, R14, is connected to the +V terminal of a 12VDC LYS-X-12 Lamda regulated power supply 2F for lamp 1. The output terminal of OpAmp 2E connects with the +S terminal; whereas the −V and −S input terminals of power supply 2F are joined together.

The lamp 1 is normally operated at 2 to 3 volts below its rated 12 volts in order to extend its useful life while maintaining its normal halogen cycle. Thus, the size of the signal present at the +S terminal determines lamp brightness to maintain color temperature at its preset value independent of fluctuations in lamp intensities.

Computer 15 is conveniently used to control and monitor the system by command from an I/O Device 16.

Computer 15 is programmed to carry out the following functions: to control the sequencing and selection of the array detector 9 output data via multiplexer 10 (shown as 3 circuit elements 10A, 10B and 10C) by 6-bit databus output 15B; to control and coordinate the integration of reference intensity data from color intensity sensor 6A and instrument status lines with the spectral data transmitted by multiplexer 10 via multiplexer 12; to control the A/D conversion and transmission of the AD converter 13 output data to I/O device 16 via a 16-bit databus 13A; to control the monochromator shutter and internal reference drive motors M1 and M2 during the internal calibrations; and to perform computations needed to obtain reflectance data in tristimulus values or in other color coordinates.

The monochromator shutter and internal reference drive motors M1 and M2 are controlled by single-bit (on-off) control signals from computer 15. Each control signal is input to the inverting terminal of the associated motor drive amplifier, 20A or 20B, typically a 741 OpAmp that is configured to operate in a current limiting mode. 5KΩ resistors R15 and R16 form a voltage divider network between the +5V supply and ground to provide a 2.5V reference signal to the non-inverting input terminals of OpAmps 20A and 20B. Upon signal, motor M1 either inserts or withdraws shutter 8C, and motor M2 inserts or withdraws internal reference standard 14. The motors are type SR601.A12 manufactured by Portescorp with E26 escapement gear drives.

The recommended equation to obtain a value of spectral reflectance for each sequenced wavelength is:

$$\% \text{ Reflectance} = 100 \times \frac{E[1]}{E[2]} \times \frac{C[A] - F[2,A] - B[A] + F[1,A]}{W[A] - B[A]} \times \frac{T[1,A] - F[1,A]}{T[2,A] - F[2,A]}$$

where:
$E[1]$ = lamp intensity at the time of the previous internal white calibrate
$E[2]$ = instant lamp intensity
$C[A]$ = detector signal with light from sample entering monochromator
$F[2,A]$ = dark current at time of previous internal white calibrate
$F[1,A]$ = dark current at time of the external white calibrate
$B[A]$ = detector signal with light from external black calibrate entering monochromator
$T[1,A]$ = detector signal from the internal white calibrate at the time of the external white calibration
$T[2,A]$ = detector signal from the internal white calibrate at the time of the previous internal white calibrate
$W[A]$ = the detector signal for an external 100% white reflectance standard (use calculated values for reflectance standards of less than 100% reflectance)

The 20-element silicon linear detector array 9 is typically a LD20-2 manufactured by Centronic and is installed at the focal plane of monochromator 8 (see FIG. 1). The linear array registers the instantaneous intensity of the radiant flux as a function of wavelength as the spectrum falls across the row of adjacent 4×0.9 mm photosensitive elements. These elements are spaced 0.1 mm apart from one another and are electrically individually connected to the input terminals of one of the three multiplex circuit elements 10A, 10B or 10C.

The interrogation of each multiplexer circuit element 10, typically a CD4051BK chip manufactured by RCA, is computer-controlled to transmit the analog data from a specific detector element to the respective output terminal and onto a common output line to preamplifier 21. Preamplifier 21 comprises an AD515 amplifier connected in current to voltage converter configuration and connects multiplexer 10 to multiplexer 12. Preamplifier 21, as well as detector array 9 and the three multiplexer circuit elements, 10A, 10B and 10C, are all located within a temperature-controlled enclosure. This is necessary, since the equivalent dark current variations of the detector array with temperature have been found to limit colorimetric stability during the intervals between internal calibrations.

Multiplexer 12, also a type CD4051BK, is a one-of-eight multiplexer that is controlled by the three-bit control line 15A from computer 15. The input data terminals of multiplexer 12 are connected to the output terminal of preamplifier 21 and the seven instrument status parameters on lines A, B, C, D, E and F, as discussed for FIG. 1. The multiplexed analog values are then output to A/D converter 13. The signal to "start convert" from computer 15 is a logic "1" pulse of nominally 1 msec duration from the computer. The end of convert (EOC) signal is a negative going pulse of 1 msec duration, which is transmitted at the end of each conversion to tell the computer that conversion is complete.

FIG. 3 is a schematic diagram of temperature controller circuits 11A and 11B which are shown in FIG. 2 being connected to multiplexer 12 and their respective temperature-controlled enclosures. The controller is designed to provide proportional control to a heating element in response to the deviation of enclosure temperature from set point temperature sensed by thermistor T1, typically a type GA51P2 thermistor. The thermistor is connected to the non-inverting terminal of a first operational amplifier 3A, typically a CA 3140 OpAmp which is biased to a preset voltage (temperature). The output terminal of this amplifier is connected to the inverting terminal of a second CA 3140 OpAmp, 3B. As the ambient temperature varies about the set-point, the output voltage of the first amplifier causes the second amplifier to develop a pulsating signal with a duty cycle that varies according to the value of voltage at its input terminal. The output terminal of the second amplifier is connected to the base of a MPS U45 power transistor T2, which serves to pulse a 12Ω MINCO #7838 8025 heating element H1 according to the heating duty cycle. The heating duty cycle determines the amount of heat delivered to the enclosure. A light emitting diode L1, is connected across the heating element terminals and provides a visual indication of each heating duty cycle.

A Zener diode, Z1, which spans the input supply voltage terminals, is used to effectively isolate power supply fluctuations from affecting the temperature controller circuit stability.

The remaining components shown in FIG. 3, namely, resistors R17–R30 and capacitors C2 and C3, are electrically connected as shown and function in the normal manner of resistors and capacitors as well known to those skilled in the art. The following are the values for the respective resistors and capacitors used: R17–10KΩ variable resistor, R18–33KΩ resistor, R19–6.2KΩ resistor, R20–10KΩ resistor, R21–3.6KΩ resistor, R22–39KΩ resistor, R23–1.0 MΩ resistor, R24–4.7 MΩ resistor, R25–10 MΩ resistor, R26–1.0 MΩ resistor, R27–27KΩ resistor, R27A–62KΩ resistor, R28 and R29–470 Ω resistors, R30–47KΩ resistor, C2 and C3–0.1μF capacitors.

A signal line, attached to the output terminal of OpAmp 3A, conveys the heating duty cycle information to multiplexer 12 via respective instrument status lines A and B for eventual correlation with the spectral intensity measurements by computer 15.

In operation, the color intensity sensors 6 generate signals that are indicative of the intensities of the respective red and blue wavelengths emitted by the lamp 1. The difference signal present at junction 2c, after zero set initialization, is a first order approximation to the ratio of the two sensor signals which is a nearly linear function of color temperature. Zero-set initialization is performed by adjusting switch 2B to force the blue signal level to agree with the red. This creates a ratio value of unity for a given color temperature; deviations from this color temperature ratio are then subsequently determined by measuring their difference. The difference between the red and blue signals is sensed in the controller 2 and amplified. The resulting control loop signal is fed to the voltage controlled power supply which powers the lamp 1. Thus, the resulting control loop signal serves to stabilize the predetermined color temperature of the lamp. At low fluctuation frequencies, the signal amplification in the controller 2 approaches the open-loop gain of an operational amplifier, thus enabling it to provide a very precise color temperature control. Lamp intensity and color temperature are independent parameters and cannot be simultaneously stabilized. The choice to use color temperature control has two advantages. It stabilizes the stray light error to produce better colorimeter repeatability, (Stray light is, for example, redlight that is scattered by the monochromator grating into detectors located to receive the incident blue light.) and it eliminates the inaccuracies which would accrue from using only finite-bandwidth, red and blue filters as references for mathematically adjusting the reflectance spectrum for color temperature changes of the illumination.

The signal from either the blue or red detector (these are always equal in a color temperature control loop) is used to mathematically correct the reflectance data for variations in lamp intensity at the prescribed lamp color temperature. The blue signal has arbitrarily been chosen at its nominal 3 volt level.

Returning to the reflectance equation, note that during the time intervals between internal calibrations, the sample reflectance C[A]is compensated by changes in lamp intensity according to E[1]/E[2]. However, upon each internal calibration, E[2] is reset to match E[1]. The internal calibration procedure includes measurement of (1) the reflectance of an internal white reference 14 which is postioned over sample cell 5 by motor M1 and (2) dark current when the shutter 8C over the monochromator entrance aperture is closed by motor M2. Improved operation may be obtained by measuring dark current more often than the internal white reference by sampling a known value of resistance, rather than by continually opening and closing the shutter. This resistor is located in the same enclosure with the detector array 9 and is sampled upon signal from computer 15 every time the detector array output 9 is read out. In this way, circuit performance can be monitored by using the resistor to simulate a shutter-obscured detector element.

One of the uses for the colorimeter is to measure the color spectrum of a paint that is being made in a production operation or in a special mixing operation. Mill bases which contain pigments of various colors as well as clear unpigmented paint vehicles are fed into a mixer and circulated through the sample cell 5 for measurement. If the color is not within a given range of a standard value, it can be adjusted by the addition of certain mill bases. Conveniently, the output from the computer can be used to control various feeds used for mixing paints to bring a paint within range of a given color standard.

I claim:

1. A colorimeter for measuring color of an object comprising:
   (a) a single light source that provides a light beam,
   (b) a controller electrically connected to the light source,
   (c) first beam-shaping optics for collimating and directing the light beam to the object, (d) a beam-splitter positioned between the object and the first beam-shaping optics which divides the light beam into a reference and analytical light beam, (e) blue and red intensity sensors electrically connected to the controller, which sensors measure the blue and red spectral intensities of the reference light beam incident on these sensors and produce: (1) electrical feedback signals to the controller which maintains the light source at a constant color temperature level; and (2) a color intensity reference signal, (f) second beam-shaping optics for directing a portion of the analytical light beam that is reflected from the object into a monochromator, (g) a grating monochromator with an entrance slit through which the reflected portion of the analytical light beam passes, (h) a detector array which converts the spectra of the light beam dispersed by the monochromator, into discrete individual electrical signals, (i) a first multiplexer system which receives electrical signals from the detector array and selectively transmits these signals to a second multiplexer, (j) a second multiplexer system which receives the signal from said first multiplexer system and the color intensity reference signal from one of the color intensity sensors to output a signal representing standardized color values of the object measured.

2. The colorimeter of claim 1 in which the object that is being measured is a cell with a clear window having liquid paint continuously flowing through the cell.

3. The colorimeter of claim 2 having an internal white reference slide that can be positioned in front of the cell to calibrate the colorimeter.

4. The colorimeter of claim 2 or 3 having temperature controller circuits that are electrically connected to the color intensity sensors and the first multiplexer system and which compensate for ambient temperature changes.

5. The colorimeter of claim 4 in which instrument status signals are fed into the second multiplexer system.

6. The colorimeter of claim 5 having a shutter position between the second beam-shaping optics and the monochromator which provides a means for blocking all light from entering the monochromator to obtain a dark current reading.

7. The apparatus of claim 1, wherein the signal output of the first multiplexer is converted into a voltage by a current/voltage amplifier.

8. The colorimeter of claim 6 in which an analog/digital converter is connected to and receives signals from the second multiplexer system for transmitting digital data to a computer that is programmed to convert the signal into standard color values.

9. The colorimeter of claim 8 in which the computer is programmed to control the operations of the first and second multiplexer systems.

* * * * *